United States Patent [19]

Tewari

[11] Patent Number: 5,098,740
[45] Date of Patent: Mar. 24, 1992

[54] UNIFORMLY-COATED CERAMIC PARTICLES

[75] Inventor: Param H. Tewari, Hudson, Mass.

[73] Assignee: Norton Company, Worcester, Mass.

[21] Appl. No.: 450,200

[22] Filed: Dec. 13, 1989

[51] Int. Cl.$^5$ .............................................. B05D 7/00
[52] U.S. Cl. ................................... 427/215; 427/212; 427/217; 427/283; 106/1.05; 106/286.1
[58] Field of Search ............... 427/215, 283, 212, 217; 106/286.1, 1.05; 502/10, 180

[56] References Cited

U.S. PATENT DOCUMENTS

| | | | |
|---|---|---|---|
| 2,853,401 | 9/1958 | Mackin et al. | 427/217 |
| 3,657,003 | 4/1972 | Kenney | 106/286.1 |
| 4,021,314 | 5/1977 | Dafter, Jr. | 106/1.05 |
| 4,054,467 | 10/1977 | Mikelsons | 427/180 |
| 4,156,040 | 5/1979 | Swider et al. | 427/226 |
| 4,528,119 | 7/1985 | Barnes | 427/215 |
| 4,632,849 | 12/1986 | Ogawa et al. | 427/215 |
| 4,716,059 | 12/1987 | Kim | 927/443.1 |
| 4,756,482 | 7/1988 | Matie et al. | 241/16 |
| 4,814,300 | 3/1989 | Helferich | 264/42 |
| 4,830,889 | 5/1989 | Henry et al. | 427/438 |
| 4,851,293 | 7/1989 | Egerton et al. | 427/215 |
| 4,902,929 | 2/1990 | Toyoda et al. | 427/215 |
| 4,931,241 | 6/1990 | Freitag | 264/86 |
| 4,985,379 | 1/1991 | Egerton et al. | 501/104 |
| 5,013,585 | 5/1991 | Shimizu et al. | 427/220 |

Primary Examiner—Michael Lusignan
Assistant Examiner—Diana L. Dudash
Attorney, Agent, or Firm—Volker Ulbrich

[57] ABSTRACT

Solids that are subject to a deleterious reaction with a dispersion medium in which they are suspended can be safely comminuted in that dispersion medium by providing therein a surfactant capable of reacting with the solid at a faster rate than the dispersion medium can so react to thereby suppress the deleterious reaction. In particular, unsintered silicon nitride or silicon carbide which when contacted with water would decompose to form silica on their surfaces can be milled in water, without producing excessive amounts of silica. The dispersions produced are sufficiently stable to be filtered through openings of 2 microns with loss of no more than 5% of the silicon nitride or carbide. Stable dispersions of solids in liquids can be coated with a different solid by surface precipitation under conditions which preclude the formation of a bulk precipitate. Thus, ceramic nitride or carbide particles are coated with densification aids, such as yttria, by the surface precipitation of the corresponding hydroxides on the ceramic particles in water. Ceramic powders prepared in this way densify to give products with moduli of rupture and fracture toughnesses at least as high as those made from powders conventionally milled in alcohol with lower amounts of densification aid.

23 Claims, 1 Drawing Sheet

17nm

FIGURE 1
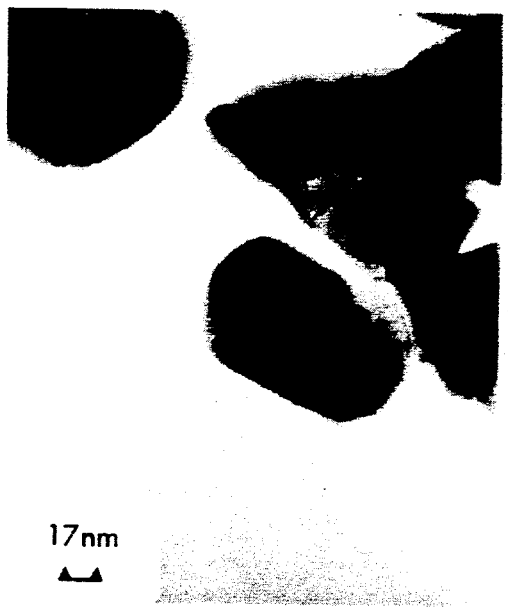
FIGURE 2
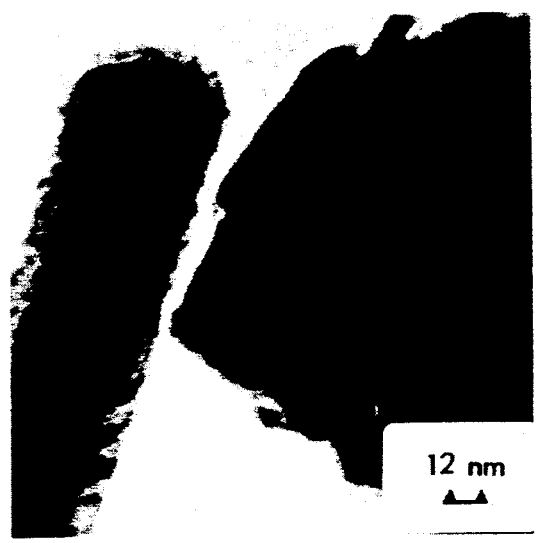
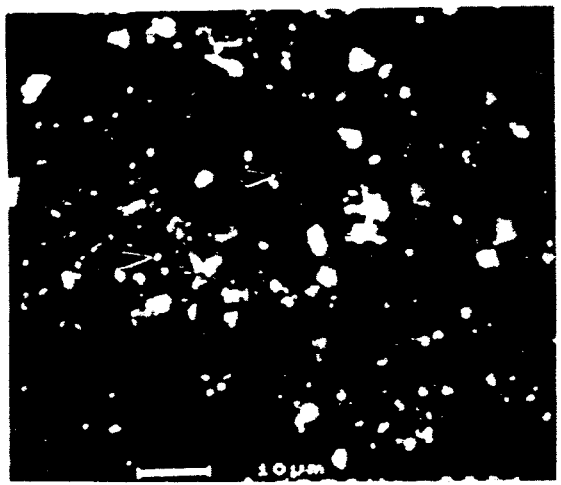
FIGURE 3

UNIFORMLY-COATED CERAMIC PARTICLES

TECHNICAL FIELD

This invention relates to ceramic particles, especially silicon nitride or silicon carbide particles, having a substantially uniform coating thereon of one or more conventional oxide sintering aids, e.g. yttria, or a precursor thereto, in the substantial absence of any individual sintering aid oxide particles. Due to a uniform coating of sintering aid on each ceramic nitride or carbide particle, the total amount of sintering aid required to produce a sintered body having excellent high temperature properties may be reduced substantially below the amounts now conventionally used. The invention also relates to a method of preparing such sintering aid-coated particles in the substantial absence of any free sintering aid particles by means of a surface precipitation of a precursor to the sintering aid upon the ceramic particles.

The invention further relates to the general comminution of one material in the presence of another material which is known to deleteriously interact with the freshly formed surfaces of the material being comminuted. More particularly, it relates to the comminution of ceramic particles, especially silicon nitride or silicon carbide particles, in water by a process which precludes deleterious reactions between the water and the ceramic particles. The aqueous comminution process also permits the incorporation of additional components, e.g. sintering aids, onto the freshly formed ceramic particle surfaces.

TECHNICAL BACKGROUND

Traditionally, sintering aid addition to ceramic materials which undergo a liquid phase densification is performed by simply milling a solid sintering aid powder with the ceramic material in the presence of an alcoholic solvent, normally isopropanol. The milling serves both to comminute the ceramic particles to a smaller and more uniform particle size and to distribute particles of the sintering aid somewhat uniformly among the ceramic particles. The result is a simple mixture of different particles which inherently means that some portions of the mixture will be richer in sintering aid particles while other portions will be poorer in them. This variation in sintering aid concentration is believed to be a cause for failure of some ceramic parts, particularly at elevated temperatures. In addition, due to the inherent non-uniformity the total amount of sintering aid needed to produce dense bodies from the ceramics is quite high. This is generally undesirable, especially for high temperature performance, because it can result in the presence of an excessive amount of glassy phase. There is need for ceramic material/sintering aid compositions which contain a lower than conventional amount of sintering aid, but have the sintering aid distributed more uniformly so that the resultant densified bodies exhibit desirable high temperature properties. This is particularly true for silicon nitride compositions.

Furthermore, the comminution of ceramic materials such as silicon nitride and silicon carbide being performed in conventional alcoholic solvents is both expensive and hazardous. The ability to perform the comminution in water without causing degradation of the ceramic material or generation of explosive levels of gases would be highly desirable. The present invention evolved from seeking a solution to each of these problems and a recognition that they are interrelated.

Previous attempts to resolve these problems has been directed at solving each individually, rather than simultaneously. U.S. Pat. No. 3,830,652 (Gazza) claims a densifiable silicon nitride composition containing an yttrium compound wherein the weight of yttrium in the yttrium compound is about 1.0 to 3.5 weight percent of the weight of the silicon nitride. This simple approach of merely using lower than normal amounts of yttria sintering aid would be wonderful, except that, as shown by comparative example below, it has not been found to produce silicon nitride bodies having sufficient high temperature properties to be commercially useful. As a result, currently produced silicon nitride bodies generally contain a minimum of about 4% by weight yttria to have sufficient high temperature properties to be commercially useful.

Another attempt at reducing the amount of sintering aid is disclosed in Japanese Publn. 62-265,171 which teaches sintering a silicon nitride material with a sintering aid which has been prepared by spraying aqueous metal salts in a solvent into a plasma flame. A reduced sintering aid usage is alleged, but only a simple mixture of silicon nitride particles and sintering aid oxide particles is produced.

A further method of adding a sintering aid is shown in Japanese Publn. 62-187,170 in which a mixture of silicon nitride particles and silicon carbide whiskers is impregnated with a solvent-based solution of yttrium hydroxide or alkoxide and then the impregnated hydroxide or alkoxide is transformed to an oxide. The process is similar to that of Shaw et al., discussed below, and produces a substantial amount of yttrium oxide particles intimately blended with silicon nitride particles and silicon carbide whiskers as well as a small amount of the nitride and carbide having a partial yttria coating.

A still further attempt is disclosed in Japanese Publn. 62-158,166 in which silicon nitride powder is mixed with a solution containing a metal nitrate, the solvent simply evaporated, and the mixture dried and baked to convert the nitrate to an oxide. The solvent is stated to be water or a 1-4 carbon alcohol. The process does not yield particles of silicon nitride uniformly coated with a sintering aid oxide because after addition of the metal nitrate to the silicon nitride particles the powder must be dried and pulverized before baking to convert to an oxide. The intermediate pulverization step means that many fresh silicon nitride surfaces are produced which can not possibly have any sintering aid thereon. Although water is suggested as a possible solvent there is no disclosure in the abstract of any step being taken to prevent or even deter the degradation of the silicon nitride that must occur by reaction with the water. Also no steps are taken to prevent the formation of individual particles of sintering aid oxide which are less efficient than a coating in promoting densification.

Japanese Publn. 61-281,069 mixes silicon carbide and silicon nitride powders in a solution containing a metal alkoxide and then calcines the mixture until the alkoxide is hydrolized. The result is predominantly a mixture of particles of silicon carbide, silicon nitride, and metallic oxide, with a small amount of metal oxide particles formed on the surfaces of the carbide and nitride powders.

Japanese Publn. 61-251,578 forms an alcoholic solution of a metal alkoxide and uses that solution in place of a metal oxide powder as a sintering aid source for silicon nitride. The result is a mere blend of silicon nitride and metal oxide particles with a slight amount of the metal oxide possibly adhering to some of the silicon nitride particles, but not completely coating them.

T. M. Shaw and B. A. Pethica in "Preparation and Sintering of Homogeneous Silicon Nitride Green Compacts", 69 *Journal of the American Ceramic Society* 88-93 (1986) teach a means to obtain a more uniform distribution of sintering aid than by conventional milling. Specifically, they teach the precipitation of yttrium, magnesium, and/or aluminum hydroxides by adding solutions of the corresponding metal nitrates to a suspension of silicon nitride powder in water which also contains tetraethylammonium hydroxide in sufficient quantity to cause precipitation of the metal hydoxide from the dispersion medium. The precipitate and the suspended silicon nitride particles, some of which may be partially coated with the precipitate, are jointly flocculated to produce a well-mixed powder of silicon nitride and densification aiding metal hydroxides. Such mixtures were found to sinter to higher final densities under the same sintering conditions than mixtures of the same chemical composition formed by conventional joint milling of constituents initially introduced into the suspension in powder form.

The general preparation of solid materials in finely divided form is a frequent practical need. Generally the process of comminuting solids is most effectively accomplished while the solids are suspended in a fluid that lubricates the flow of the particles as they interact with the milling balls, knives, or the like that are used to accomplish the actual division of the relatively large solid particles into smaller ones. The division of solid particles into smaller ones necessarily produces new solid surfaces and therefore promotes chemical reaction between the new surfaces and constituents of the environment in which the surfaces are formed. At times, these reactions are deleterious to the properties desired in the fine solid material being prepared and/or generate explosive levels of gases, so that preventing such reactions would be advantageous.

One of the well-known examples of a deleterious reaction between a suspension medium and a solid material being comminuted is silicon nitride and water since the silicon nitride readily reacts with water leaving a substantial coating of silica on the silicon nitride surface. It is known that in the presence of water silicon nitride undergoes the reaction:

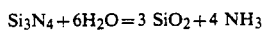

$Si_3N_4 + 6H_2O = 3 SiO_2 + 4 NH_3$

And in the presence of water, silicon carbide undergoes the reaction:

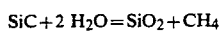

$SiC + 2 H_2O = SiO_2 + CH_4$ which again results in the presence of substantial amounts of silica on the particle surfaces. The silica in each case can reduce the usefulness of the particles particularly at high temperatures. Also the water can generate dangerous amounts of ammonia or methane. Based upon these problems, milling of silicon nitride and silicon carbide in water, while having been attempted, has previously generally been avoided. Also, milling in water has been found to cause extreme morphological changes in the powder by forming extensive hard agglomerates which have impeded densification and adversely affected the mechanical properties of the resultant dense body. As a result, conventional practice in the art is to mill silicon nitride or silicon carbide in an organic solvent, such as isopropanol, to produce the very fine powders used for making shaped articles having desirable physical properties, particularly at high temperatures. Alcohol is more expensive and more hazardous, due to its potential for fires and explosions, than water. Also it is becoming more difficult to dispose of due to environmental considerations. It would be clearly more advantageous to use water as the milling mediium.

Although the presence of small amounts, i.e. less than about 2%, of silica in silicon nitride is normally not detrimental, larger amounts are generally undesirable in the intergranular phase of silicon nitride articles intended for service at high temperatures. In addition, some densifying aid oxide is needed to permit adequate densification under known practical temperatures and pressures. The most preferred densification aid at present is yttria, with magnesia an alternative for lower temperature uses, and mixtures of these constituents with each other, with a small amount of silica, or with other metal oxides being known in the art. Conventionally, oxide sintering aids have been milled together with the silicon nitride or silicon carbide powders in alcohol. While this has produced adequate results for many applications, it is generally believed that a more uniform distribution of sintering aid than can now be achieved by conventional milling in alcohol is desirable to permit a reduction in the total amount of sintering aid needed.

SUMMARY OF THE INVENTION

It has now been found that solid materials can be milled in a liquid with which the materials are reactive, while actual reaction with the liquid is minimized or prevented by the presence of a sufficient amount of a surfactant in the liquid. It is believed that the surfactant covers, and may even chemically react with, freshly produced solid surfaces before reaction can occur with the liquid dispersion medium. In particular, ceramics, particularly nitride and carbide ceramics, and most particularly silicon nitride and silicon carbide, can be milled in water in the presence of suitable surfactant materials to produce a readily densifiable powder without an undesirably high silica content and without causing any substantial agglomeration. Furthermore, suspensions prepared by this process can be filtered through filters with average openings at least as small as two microns with less than about 2% loss of ceramic powder content which has not usually been possible with slurries prepared by conventional means since a non-uniform amount of ceramic and sintering aid particles would be removed.

The ability of being able to place the ceramic powders in water, without causing a deleterious reaction, in combination with control of the surface chemistry enables a more effective and economical mixing of sintering aids with the ceramic particles which results in surface precipitation of a densification aid, or more usually a precursor of it, onto the surfaces of the suspended ceramic particles, without simultaneously precipitating any of the sintering aid or its precursor in the bulk of the suspension medium. The resultant ceramic particles are essentially completely coated with the sintering aid or its precursor in the substantial absence of free sintering aid or precursor particles. Specifically, a metal hydroxide that will readily convert to a densification-aiding metal oxide is controllably precipitated onto the surfaces of suspended nitride or carbide particles while avoiding simultaneous precipitation of hydroxide particles in the bulk. Thus, a desirable intergranular phase constituent, such as yttria, is distributed over the nitride or carbide powder surfaces with exceptional uniformity, thereby reducing the total amount of sintering aid required for densification. Moreover, the process is particularly advantageous when two or more sintering aids are used simultaneously, since they can be deposited either simultaneously or, more preferably, sequentially thereby providing additional control of the subsequent densification.

BRIEF DESCRIPTION OF THE DRAWINGS

FIG. 1 is a scanning transmission electronmicrograph of silicon nitride particles which have been milled in water containing 2% Cavco Mod APG surfactant.

FIG. 2 is a scanning transmission electronmicrograph of the particles of FIG. 1 wherein 4% yttria has been surface precipitated thereon.

FIG. 3 is a scanning transmission electronmicrograph of conventionally prepared mixture of silicon nitride particles which have been milled in isopropanol with yttria present.

DESCRIPTION OF THE PREFERRED EMBODIMENTS

The present invention is applicable to nitride and carbide ceramic powders which are reduced in size to form very fine powders which are then used to produce useful articles. More particularly it is applicable to ceramic powders which undergo a liquid phase densification. Examples of suitable such nitride and carbide powders include, but are not limited to, silicon nitride, aluminum nitride, boron nitride, titanium nitride, silicon carbide, boron carbide, and titanium carbide.

To prepare the nitride and carbide ceramic particles having a surface precipitated coating of sintering aid oxide in the substantial absence of free sintering aid particles, (i) the ceramic material is comminuted, preferably in water, to a desired fine particle size, (ii) a metal salt which will generate metal ions of the desired sintering aid is added to the ceramic particles in the form of an aqueous solution, generally after the comminution, (iii) the metal ions combine with hydroxyl ions and a metal hydroxide precursor to the desired oxide is surface-precipitated onto the ceramic particles from the aqueous solutions under conditions which preclude the precipitation of the precursor in the bulk, and finally (iv) the precursor is converted to the desired final oxide.

The comminution (milling) of the nitride or carbide particles to the desired fine particle size may be performed in a conventional manner in the presence of an alcoholic solvent, such as isopropanol, and then dried to remove the solvent. In this case the inherent oxide surface that forms upon exposure to air should be removed by acid washing to improve surfactant adhesion. Preferably, however, the milling is performed in the presence of water and a surfactant which is more reactive with nitride or carbide than is the water so that the ceramic material is protected from attack by the water and thus reaction with the water is prevented. Suitable surfactants useful herein include amino-functional zircoaluminate surfactants having an inorganic polymer backbone (from Cavedon Chemical, now Manchem), silanes, titanium alkoxides, aluminum alkoxides, zirconium alkoxides, iridium-based surfactants, and the like. Of course, the selected surfactant must not detrimentally effect the performance of the ceramic material in its intended use. In addition, the surfactant must not generate any substantial amount of foam which could deleteriously effect the comminuting operation. Preferably, it is an organofunctional zircoaluminate. More preferably the organofunctional groups are selected from amino, mercapto, carboxy, and oleophilic groups. Still more preferably, the zircoaluminate surfactant is the reaction product of a chelated aluminum moiety, an organofunctional ligand, and a zirconium oxyhalide, the organofunctional ligand being complexed with and chemically bound to the chelated aluminum moiety, the aluminum moiety having the formula $Al_2(OR_1O)_aA_bB_c$, wherein each of A and B is hydroxy or halide and each of a, b, and c are integers such that $2a+b+c=6$, and $OR_1O$ is (a) an alpha, beta or an alpha, gamma glycol group in which $R_1$ is an alkyl group having about 1 to about 6 carbon atoms or (b) an alpha-hydroxy carboxylic acid residue having the formula:

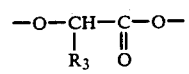

wherein $R_3$ is H or an alkyl group having about 1 to about 4 carbon atoms; said organofunctional ligand being (a) an alkyl, alkenyl, alkynl, or aralkyl carboxylic acid having about 2 to about 36 carbon atoms, (b) an aminofunctional carboxylic acid having about 2 to about 18 carbon atoms, (c) a dibasic carboxylic acid having about 2 to about 18 carbon atoms, (d) an acid anhydride of a dibasic acid having about 2 to about 18 carbon atoms, (e) a mercapto functional carboxylic acid having about 2 to about 18 carbon atoms, or (f) an epoxy functional carboxylic acid having about 2 to about 18 carbon atoms; said zirconium oxyhalide moiety having the formula $ZrA_dB_e$, wherein A and B are as above defined and d and e are integers such that $d+e=4$; the molar ratio of chelated aluminum moiety to zirconium oxyhalide moiety being about 1.5 to about 10; and the molar ratio of organofunctional ligand to total metal being about 0.05 to about 2.

Generally the surfactants useful herein are those surface active agents which are sufficiently attracted to the nitride or carbide particles to react therewith more rapidly than can water. The surfactant serves to prevent, or at least substantially retard, reaction of the nitride or carbide with water while simultaneously not generating an excessive amount of foam which would interfere with the milling process. The surfactant is normally used in an amount of about 0.5 to about 10, preferably about 1 to about 5, weight % based on the water. The milling is normally conducted for an extended period of at least about 10 hours, though the time has not been found critical provided that the desired particle size is achieved. The water milling in the presence of the surfactant has been found to substantially increase the milling efficiency such that the total milling time required to produce a particular average size particle has been found to be reduced by 50 to 70 % or more.

The comminution of the relatively large nitride or carbide particles to the desired particle size may be performed in any conventional mill or other particle comminution device that operates on the principle of suspending solid particles in a liquid medium. Examples of suitable such devices include vibratory, ball, and attritor mills, and the like.

The sintering/densification aids added to the nitride or carbide include those conventional oxides which are known to be useful for densifying the ceramic material involved. Examples of suitable oxides include those of rare earth metals such as yttrium, as well as magnesium, zirconium, aluminum, cerium, hafnium, and mixtures thereof. Preferably the sintering aid is selected from yttria, magnesia, and mixtures thereof. Most preferably the sintering aid is yttria. Precursor hydroxides of these sintering aids which can be surface-precipitated in accordance with this invention are prepared in situ from metal salts which produce metal ions when placed in water. Salts which can generate the desired metal hydroxide precursors include yttrium nitrate, yttrium chloride, yttrium acetate, magnesium nitrate, magnesium bromide, magnesium acetate, and mixtures thereof. Most preferably the salt used is the nitrate of the particular metal because the product of neutralization, ammonium nitrate, is readily decomposable at low temperatures with no deleterious effect on the ceramic products. The amount of sintering aid used will depend upon its particular efficiency and the use to which the final body will be put, but generally an amount of about 0.5 to about 10 % by weight of the ceramic material will be appropriate. Preferably, the amount of sintering aid will be as low as possible, particularly for high temperature applications.

For silicon nitride the amount of sintering aid can be less than about 2%, since silicon nitride bodies prepared with as little as 0.7 weight % yttria in accordance with the present invention have shown essentially equivalent performance to conventionally prepared bodies having 4% yttria. Most preferably, the sintering aid is yttria which is used in an amount of about 0.5 to about 1.2 weight %.

To deposit the sintering aid precursor hydroxide on the surfaces of the nitride or carbide particles which have been previously milled, i.e. in alcohol, and dried, the milled particles can be slurried in water which contains the surfactants described above, in substantially similar amounts, along with the necessary metal salt. To deposit the sintering aid precursor hydroxide in the preferred case where the milling operation is performed in water, the desired metal salt may simply be added to the mill after the milling is completed and, preferably, after the milled suspension has been filtered to remove any nitride or carbide particles larger than about 2 microns. The slurry may also contain an alcohol in up to about 50% of the weight of the water. The deposition of the sintering aid precursor hydroxide upon the milled particles by surface precipitation is then performed by adding the desired metal salt and then slowly increasing the pH of the solution by the addition of a base such as aqueous ammonia. The deposition conditions are selected to preclude any bulk precipitation of the sintering aid hydroxide precursor so that the final composition is substantially free of independent sintering aid oxide particles. To achieve this, advantage is taken of the fact that the pH of the surface of the nitride or carbide particle, pH(s), is related to the pH of the bulk solution, pH(b), as follows:

$$pH(s) = pH(b) + \psi e \psi y / 2.3 kT$$

wherein $\psi e$ is electronic charge of the metal, $\psi y$ is the surface potential of the particle suspension, k is the Boltzmann constant, and T is the absolute temperature (J. T. Davies et al., Interfacial Phenomena, Academic Press, p 95, 1963). The pH(s) is the same as pH(b) only when $\psi y$ is zero. There is generally a 2-3 pH unit difference between pH(s) and pH(b) in stable suspensions. To assure that only surface precipitation of the sintering aid precursor occurs, the pH of the entire system is controlled to be at least about 1.5, preferably at least about 2, and most preferably at least about 2.5 pH units below the hydrolysis constant of the specific metal ion until almost all, i.e. at least about 90 percent, of the metal has been consumed in the surface precipitation. Thereafter, the pH can be increased to slightly below the hydrolysis constant to assure that all of the metal is precipitated onto the nitride or carbide surfaces and that essentially none of it is precipitated in the bulk.

If two or more sintering aids are desired for a particular ceramic material, they may be deposited from a single solution containing metal ions of each. More preferably, the sintering aids will be deposited in a sequential manner, thereby providing an additional means of controlling the interaction of the materials to obtain optimum densification results and physical properties of the resultant ceramic body.

The precursor hydroxide coating may be converted to the desired oxide by simply heating the particles. Generally this will be performed at temperatures generally greater than about 20° C. and under conditions which will not cause degradation of the nitride or carbide. Thus the maximum temperature may be as high as conventional sintering temperatures if the conversion is performed in an inert atmosphere, but normally only up to about 250° C. when performed in the presence of oxygen to minimize any reaction with oxygen. Preferably, the conversion is performed by placing the material in a vacuum oven at about 180° C. It should be noted that these temperatures are substantially below those at which the corresponding bulk hydroxides convert to oxides. For instance, bulk yttrium hydroxide converts to yttrium oxide at a temperature of about 350°-540° C. (M. D. Rasmussen et al, Ceramics International, 11:51, 1985) and bulk zirconium hydroxide converts to zirconia at a temperature of about 300°-430° C. (Taichi Sato, Thermochemica Acta, 34:211, 1979)

The nitride or carbide particles having a coating of sintering aid or precursor may also be used directly for slip casting or shape forming procedures without drying or they may be dried in any conventional manner. Freeze-drying has been found to be particularly advantageous since it minimizes particle aggregation. Thereafter the sintering aid coated particles may be used in the same manner as previous ceramic material/sintering aid mixtures, i.e. conventional forming procedures such as cold pressing, hot pressing, gas pressure sintering, hot isostatic pressing, and the like may be used. Further details on sintering procedures are not included herein as they readily exist in the open literature.

The resultant nitride or carbide particles have surfaces which consist essentially of the sintering aid oxide or its hydroxide precursor. For instance, silicon nitride particles coated with about 0.7 weight % yttria produced a coating about 2 angstroms thick (about a monolayer). When the yttria amount was increased to about 1%, the layer was about 2-3 angstroms; when the yttria amount was 2%, the coating was about 6-7 angstroms (about two monolayers). The silicon nitride particles are believed to be uniformly coated even at the very low levels of sintering aid, but no direct means for confirming this is currently available. As shown in the examples below, the presence of a uniform coating is supported by relative acoustophoretic mobility techniques (RAM) and by electron spectroscopy for chemical analysis (ESCA), scanning transmission electron microscopy (STEM), and most importantly by the successful preparation of densified silicon nitride bodies from coated particles having less yttria than is required for conventionally prepared particle mixtures.

The coated nitride or carbide particles produced are in the substantial absence of any free sintering aid particles. It is believed that no free sintering aid particles are produced by the surface precipitation process of the invention since none were detectable by examination of scanning transmission electronmicrographs of the products. However, this does not preclude the presence of trace amounts of some free sintering aid particles.

Also, while it is expected that the coated particles will be used in this condition, i.e. in the substantial absence of free sintering aid particles, since this is considered the most efficient way to utilize the sintering aid, it is also within the scope of the present invention to intentionally add free particles of one or more sintering aids to the sintering aidcoated particles. While this would partially defeat the purpose and some of the benefits of the surface precipitation process, it will not prevent the use of the sintering aid oxidecoated ceramic particles in many applications.

The surface precipitation process also avoids any contamination problem which could occur when dealing with fine particles of different sintering aids. Since no particles of sintering aid oxides are milled to an ultrafine particle size, dedicated equipment for each particular sintering aid is avoided.

While one aspect of the present invention is to form sintering aid-coated nitride and carbide particles in the substantial absence of free sintering aid particles, the process of preparing suspensions of finely divided particles of solid materials when the finely divided materials will undergo a deleterious reaction with the suspension medium is of more general application. It has been found that reactions between a fluid, i.e. water, and a freshly prepared finely divided particle may be precluded by the addition of surfactants which are soluble in the fluid and which protect the finely divided particles from attack by the fluid. Examples of materials which may be protected include silicon nitride, silicon carbide, boron nitride, aluminum nitride, and other carbides and nitrides. Thus when fine particles of these and other materials are required in the absence of any sintering aid coatings, they may readily be prepared by comminuting larger particles thereof in water in the presence of the surfactants in the manner described above.

The best mode known for using this invention involves comminution of materials comprising either silicon nitride or silicon carbide in water to prepare powders upon which a sintering aid precursor hydroxide is surface precipitated so that the resultant powders are useful for molding and eventual densification to near-theoretical density.

The practice of the invention may be further understood from the following non-limiting examples in which all parts and percents are by weight unless otherwise specified.

EXAMPLES 1-6 AND COMPARATIVE EXAMPLES C-1-C-9

These examples and comparative examples demonstrate the comminution of silicon nitride particles in water which would normally be expected to attack the surfaces of the silicon nitride and convert them to silica. For each of these examples, 250 g of silicon nitride powder and 750 g of dispersion medium were milled together with 3 kg of dense silicon nitride-yttria milling media in a vibratory mill (Sweco mill). Each such lot was milled for about 18-20 hours. The surface areas of the powders were determined before and after milling by conventional BET adsorption using nitrogen gas. The dispersion media used are shown in Table 1. In Table 1, "Kem" for the type of silicon nitride means KemaNord SICONIDE grade P 95 C, available from Superior Graphite Co., Chicago, Ill.; "Ube SN-E 10" indicates, a grade so designated by the manufacturer, Ube Industries, Ltd., Tokyo, Japan for a substantially equiaxed, high purity silicon nitride powder made by a liquid-interfacial reaction method and having >95% alpha phase and a surface area of about 10 square meters per gram; "Ube SN-E 05" and "Ube SN-E 02" are the same as Ube SN-E 10 except for having larger particles, giving them a specific surface areas of about 5 and 2 m2/g respectively; "Ube B" is a mixture of 40% Ube SN-E 10 and 60% Ube SN-E 05; and "Ube T" is a mixture of 20% Ube SN-E 10, 30% Ube SN-E 05, and 50 % Ube SN-E 02; "Nor" is Type HN-63 silicon nitride from Norton Company, Worcester, MA. Each of the silicon nitrides is generally at least about 95% silicon nitride.

"Cavco Mod APG" is an amino-functional zirocoaluminate surfactant having an inorganic polymer backbone, dissolved in propylene glycol, available from Cavedon Chemical Co., Inc., Woonsocket, R.I. Its total metal content is about 4.1 to 4.4 %, with the surface active component being about 20 % of the total. The synthesis and chemical structure of Cavco Mod APG are set forth in U.S. Pat. No. 4,539,049, particularly in columns 2–4 thereof, and more particularly in lines 21-23 and lines 47-52 of column 3 thereof, the subject matter of which is hereby incorporated by reference. "Coco" is an abbreviation for a mixture of coco alkylamine acetates, Chemical Abstracts Registry No. 61790-57-6, available from Armak Chemicals, Chicago, Ill.

TABLE 1

Dispersion Media and Type of Silicon Nitride Used for Examples 1-6 and Comparative Examples C1-C9

| Designation | Silicon Nitride Used | Dispersion Medium |
|---|---|---|
| C-1 | Nor | Deionized water, pH 7.0 |
| C-2 | Nor | Deionized water adjusted to pH 4.0 with nitric acid |
| C-3 | Nor | Deionized water adjusted to pH 11.0 with ammonia |
| C-4 | Nor | Isopropyl alcohol (commercial grade) |
| C-5 | Kem | 25 volume % IPA in deionized water |
| C-6 | Ube B | Isopropyl alcohol |
| C-7 | Kem | Deionized water, pH 7.0 |
| C-8 | Kem | Deionized water adjusted to pH 4.0 with nitric acid |
| C-9 | Kem | Deionized water adjusted to pH 11.0 with ammonia |
| 1 | Ube B | Deionized water + 1% Cavco Mod APG |
| 2 | Ube B | Deionized water + 2% Cavco Mod APG |
| 3 | Ube B | Deionized water + 4% Cavco Mod APG |
| 4 | Kem | Deicnized water + 2% Cavco Mod APG |
| 5 | Ube T | Deionized water + 2% Cavco Mod APG |
| 6 | Ube B | Deionized water + 1% Coco |

The milling conditions were determined by having performed a preliminary screening for attractive operating conditions which would minimize the amount of ammonia generated during the milling. All of the comparative examples except C-6, which represents the currently established conventional art, generated substantial amounts of ammonia during milling. C-5, with some of the water replaced by isopropanol, produced less ammonia than the others but still did not make satisfactory powder in comparison with C-6.

All of the Examples 1-6 generated less ammonia during the milling than did any of the comparative examples except C-4 or C-6. Examples 2, 4, and 5 all generated approximately equal amounts of ammonia during milling, smaller amounts of ammonia than the other examples, while Example 3, with more surfactant, generated more foam and was thus considered less desirable. It was therefore concluded that Cavco Mod APG at a level of about 2% was the best surfactant among these examples. Example 6 using Coco at 1% did show evidence of foaming and also produced more ammonia (and thus silica) than the other Examples and thus Coco is suggested for primary use for silicon nitrides which will not be subjected to extremely high temperatures.

Several replications of Example 2 were made, and it was always found that the surface area of the resulting powder was within the range of 9.7–10.7 $m^2$/g and the oxygen content 1.5 plus or minus 0.1%. These values are the same as those obtained for silicon nitride conventionally milled in alcohol as shown in Comparative Example C-6.

Fourier transform infrared spectroscopy of some of the powders produced in these Examples showed that those milled in alcohol contained hydrocarbon functional groups, probably isopropyl siloxyl groups, and significant amounts of surface N—H bonds. The presence of such groups at the surfaces of the powders probably contributes to their favorable lack of a strong tendency to agglomerate until compressed into green bodies. The powders produced by Examples 2 and 3 have spectra indicating the presence of similar chemical species and also have excellent dispersibility and little tendency to agglomerate. To the contrary, the powders from the other comparative examples had in their spectra extensive absorption ascribed to Si—O—H bonds and very little absorption ascribed to N—H bonds.

After milling, the slurry of Example 2 had a pH of about 9.4 in the bulk. The slurry is very stable and was readily filtered through conventional filters with opening sizes as small as 2 microns, without loss of more than 5% of the silicon nitride content. This is a further demonstration of the high quality of the dispersion obtained, and represents a useful technique for removing hard agglomerates or foreign particles that could be a source of weakness in bodies made by densifying the powders. The powder after drying by a preferred freeze drying technique is fluffy and readily redispersible, at least as well as that powder prepared by conventionally alcohol milling.

EXAMPLES 7-10

These examples illustrate the selective precipitation of one solid (yttrium hydroxide) on the surface of another (silicon nitride) by control of surface activity of reagents with respect to the bulk activity. A slurry prepared as in Example 2 was filtered successively through filters having average openings of 10 microns, 5 microns, and 2 microns. Less than 2% of the slurry was retained which confirms that the suspension is very well deflocculated and that the suspension is well-stabilized by the surfactant covering the silicon nitride particles.

To the suspension prepared as described above, nitric acid was added slowly with stirring to reduce the pH to about 7. An aqueous solution of yttrium nitrate having the desired amount of yttrium was then added slowly with stirring. To this solution was slowly added an aqueous ammonia solution with constant monitoring of the pH of the bulk suspension. Precipitation of yttrium hydroxide on the surfaces of the silicon nitride particles commenced immediately. The amount of yttrium ion added to the suspension was sufficient to form yttria in an amount of 0.7% of the silicon nitride powder for Example 7, 1.4% for Example 8, 2.8% for Example 9, and 4.0% for Example 10. After addition of the ammonia had caused more than 90% of the yttrium to be precipitated as yttrium hydroxide, the pH was gradually raised in the bulk of the dispersion medium by the addition of aqueous ammonia until the pH reached about 10.5. This was done to assure essentially complete precipitation of all the added yttrium ion as yttrium hydroxide on the surface of the suspended solid powder. The hydrolysis constant for yttrium is about 12 and thus no yttrium hydroxide should have precipitated in the bulk.

Measurements of relative acoustophoretic mobility ("RAM") as a function of pH showed that the powder of Example 10 containing about 4% yttrium hydroxide had an RAM essentially identical to that of pure colloidal yttrium hydroxide. With the lesser amounts of yttrium used in the other examples, the RAM measurements showed behavior in between yttrium hydroxide and silicon nitride, depending on the extent of yttrium hydroxide coverage of the surface.

The RAM measurements indicate that the surface layer formed in these Examples was capable of reversible hydration-dehydration cycles between hydroxide and oxide on drying at room temperature and redispersion in water. When the powder was dried and then redispersed in water, the RAM behavior in each case was closely analogous to that of colloidal yttria. As the redispersed powder remained in contact with water, its RAM behavior returned to that characteristic of yttrium hydroxide instead. This reversibility suggested that the material present on the surface may have a somewhat different chemical reactivity than conventional bulk yttrium hydroxide or yttrium oxide, but the material was capable of being converted to the oxide by drying and heating, such as would automatically occur if the coated powder were directly formed into a green body and densified. Any such material is regarded herein as a precursor to the desired oxide. The oxide formed may also have a somewhat different chemical reactivity from bulk yttrium oxide because there was some evidence that the coated powders formed by this method densified more readily at a given temperature than would be expected for the amount of oxide present in the powder.

The products were also studied by electron spectroscopy for chemical analysis ("ESCA"). The spectra for powders with yttrium compounds coated on the surface are significantly different from those for uncoated powders only in the presence of peaks ascribable to the yttrium compounds and in attenuation of the peaks ascribable to the 2p orbital electrons of silicon and the 1s orbital electrons of nitrogen in samples with coatings. assuming an attenuation length, lambda, of 1.8 nanometers for silicon 2p electrons and even coverage of the yttrium compound on the powder surface, the thickness of the coating can be estimated from the equation:

$$I_1/I_2 = e^{-x/1.8}$$

where $I_1$ and $I_2$ are the intensities of the silicon 2p spectra in the uncoated and coated powders respectively, e is the base of natural logarithms, and x is the thickness of the covering in nm. This calculation indicates that the coatings had thicknesses of about 0.2 nm in Example 7, 0.2-0.3 nm in Example 8, 0.7 nm in Example 9, and 0.9 nm in Example 10.

The powders from these Examples were also studied by surface transmission electron microscopy ("STEM"). STEM images for powder from Examples 2 and 10 are shown in FIGS. 1 and 2 respectively. The powder shown in FIG. 1 contains no yttrium coating and is relatively smooth, while that of FIG. 2 with an yttrium surface precipitated coating is noticeably rough in comparison. This is consistent with a coverage of very fine microcrystals of yttrium hydroxide or oxide. The surface area of the yttria-coated powders increases with increasing yttria content and is substantially greater than silicon nitride with no yttria coating, as shown in Table 2.

TABLE 2

| Specific Surface Area as a Function of Amount of Yttria | | | | | |
|---|---|---|---|---|---|
| Wt % Yttria Added: | 0 | 0.7 | 1.4 | 2.8 | 4.0 |
| Sq. Meters per Gram: | 10.2 | 11 | 13.5 | 13.5 | 19 |

A STEM image of similar silicon nitride powder milled in alcohol together with yttria, according to the conventional prior art, is shown in FIG. 3. Discrete small particles of yttria are scattered inhomogeneously among the milled powder, with little, if any, evidence that any of the yttria is adhered to the silicon nitride or comes even close to uniformly covering its surface. This is in sharp contrast to the yttria-coated powder of this invention as shown in FIG. 2. As shown by Comparative Example C-10 below, the non-uniformly distributed yttria produced by alcohol milling is less effective as a sintering aid than the much more nearly uniform coating of the present invention.

The powders prepared according to Examples 7-10 were conventionally cold pressed into green bodies and then densified in a hot isostatic press ("HIP") according to the teachings of U.S. Pat. No. 4,446,100. The densities achieved thereby were (in megagrams per cubic meter) 3.218 for Example 10, 3.186 for Example 9, 3.178 for Example 8, and 3.171 for Example 7.

Conventional test bars for measuring modulus of rupture (MOR) were cut from the densified products from Examples 9 and 10. The bars from Example 10 had an MOR of 760+or −100 megapascals (MPa) at room temperature (average of fifteen tests) and an MOR of 580+or −40 MPa at 1370° C. (average of five tests). Those from Example 9 had an MOR of 750+or−100 MPa at room temperature and of 560+or−13 MPa at 1370° C. Fracture toughness values were measured (by a controlled flow method with a 10 kg load) only at 1370° C. and were 5.6 MPa m$^{0.5}$ for Example 10 and 5.1 MPa m$^{0.5}$ for Example 9. All these values are at least about equal to those obtained by similar processing of powders milled in alcohol with additions of the same amount of yttria during milling.

Scanning electron micrograph of chemically etched surfaces of material densified as described above show that the silicon nitride microcrystals have exceptionally long, asymmetric shapes with aspect ratios up to 8. The micrographs do not show any porosity even at 10,000× magnification. X-ray diffraction patterns show that the conversion to beta silicon nitride appears complete, with no other phases detectable; the sensitivity is too low to detect the yttrium containing intergranular phase expected to be present.

No presence of any of the surfactants was detected in any of the samples, suggesting that the level either was below the level of detection or that the surfactants were totally destroyed during the high temperature processing.

COMPARATIVE EXAMPLE C-10

To evaluate the sintering ability of low levels of yttria added to silicon nitride conventionally, i.e. as particles during milling in isopropanol, as compared to the yttria-coated silicon nitride powders of the present invention, samples were prepared by each method at a rate of 0.7 and 1.0% yttria.

The conventional silicon nitride compositions were prepared by mixing the compositions with a small amount of isopropanol to form a slurry. The two slurries were each placed in a mill jar together with several silicon nitride balls and mixed for approximately twenty-four hours. Each slurry was removed and dried. About 55 g of each of the dried powders was formed into a billet by cold isostatic pressing at 30,000-50,000 psi. The samples were then degassed at 1350° C. and then hot isostatically pressed in a glass encapsulant at 1860°-1900° C. for one hour. Neither of these samples densified to full density, having densities of less than 3.17. To determine the strength of the resultant bodies, machining of standard modulus of rupture bars from the billets was attempted. No such bars could be machined because the billets were so cracked and porous.

For comparison purposes, coated silicon nitride particles were prepared in accordance with the procedure of Examples 7-10, i.e. having yttria deposited upon the particles as a substantially uniform surface layer coating, but having 0.7 and 1.0% yttria respectively. The particles were formed into billets by cold isostatic pressing and then hot isostatically pressed in a glass encapsulant as were the conventional samples. The resultant billets were fully dense and uncracked. Modulus of rupture bars were machined from the billets of the 1.0% yttria composition and were found to have a room temperature flexure strength of 132±19 ksi.

EXAMPLE 11

The procedure of Examples 1-6 was repeated to demonstrate that materials other than silicon nitride can be protected from deleterious reactions with a suspension fluid during comminution. The material comminuted was silicon carbide and the fluid was water. Cavco Mod APG was used in one sample as the surfactant at a level of 2% while the other sample contained no surfactant. Milling was continued for about 15 hours at which point the samples were evaluated for the presence of oxygen which was found at a level below about 1.8% in the sample containing the surfactant. The oxygen content was about 6% in the corresponding sample not containing the surfactant.

COMPARATIVE EXAMPLE C-11

The procedure of Examples 1-6 is repeated with a variety of different surfactants which were found either to cause excessive foam or to insufficiently protect the silicon nitride from degradation due to its reaction with the water dispersion medium. The surfactants tested and results of the milling tests were as shown in Table 4 which follows:

TABLE 4

| | Surfactant | Results of Milling |
|---|---|---|
| (a) | Coco - 2% | Excessive foaming and silica |
| (b) | Coco - 4% | Excessive foaming and silica |
| (c) | Ammonium polyacrylate - 2% | Excessive silica formation |
| (d) | Pluronic P123 - 2% | Excessive silica formation |
| (e) | Daxad - 2% | Excessive silica formation |
| (f) | Colloid 111M - 3% | Excessive silica formation |

In Table 4 "Pluronic P123" is a polyol formed by the addition of propylene oxide to the two hydroxyl groups of a propylene glycol, having an average molecular weight of 4,400, and available from BASF; "Daxad" is a sodium salt of a polymerized alkyl naphthalene sulfonic acid and available from Diamond Shamrock; and "Colloid 111 M" is an amine salt of a polycarboxylate and available from Calgon.

EXAMPLE 12

The procedure of Examples 7-10 is repeated except the yttrium nitrate is replaced by magnesium nitrate which is used in an amount to produce a coating of about 0.5% surface precipitated magnesium hydroxide on the silicon nitride particles. The hydrolysis constant for magnesium ion is about 12. Accordingly, the pH of the deposition solution is maintained below about 10.5 until most of the magnesium has been deposited. Thereafter, the pH is increased to about 11 to assure complete utilization of the magnesium. The resultant magnesium hydroxide coated silicon nitride particles are then used directly to cast modulus of rupture test bars. When the bars are evaluated along with bars prepared from conventionally milled silicon nitride-magnesia compositions containing about 1% magnesia, an amount which is often used, the results are substantially the same even though the bars of the present invention only contained 50% of the magnesia of the conventional bars.

EXAMPLE 13

The procedure of Example 11 was repeated to evaluate the effectiveness of other surfactants (1% by weight) at protecting silicon carbide from reaction with water milling medium while milling for 24 hours. The surfactants evaluated and results obtained are shown in Table 5.

TABLE 5

| | Surfactant | Results of Milling |
|---|---|---|
| (a) | Triethylamine titanate | Good - 1.44% oxygen |
| (b) | Zirconium alkylamine (13% metal) | Poor - blew mill |
| (c) | Manchem S (mercapto functional zircoaluminate) | Excellent, no gas |
| (d) | Manchem F (oleophilic zircoaluminate) | Excellent, no gas |
| (e) | Manchem C (carboxy functional zircoaluminate) | Excellent, no gas |

EXAMPLE 14

The procedure of Examples 1-6 was repeated with a variety of different surfactants which were found to protect silicon nitride from undue deleterious reactions with water. The surfactants tested and the results of the milling tests are shown in Table 6 below.

TABLE 6

| | Surfactant | Results of Milling |
|---|---|---|
| (a) | Triethanolamine complex of Ti (Tyzor TE) | Fair - 1.44% oxygen |
| (b) | Alkanolamine complex of Zr (MPD 6212) | Poor - 2.48% oxygen |
| (c) | Alkanolamine complex of Ti (Tyzor DEA) | 1.26% oxygen; 9.45 m$^2$/g surface area |

EXAMPLE 15

The procedure of Examples 1-6 was repeated several times to produce water-milled silicon nitride particles which were dried and their particle sizes determined. The particles were then coated with 1% yttria by the procedure of Example 7 with were dried and their particle sizes determined. The average results of the multiple different determinations were:

| | As Milled | After Yttria |
|---|---|---|
| $D_{10}$ | 0.20 | 0.22 |
| $D_{50}$ | 0.60 | 0.63 |
| $D_{90}$ | 1.00 | 1.06 |

The presence of a uniform yttria coating is substantiated by the consistency of the particle size results.

EXAMPLE 16

The procedure of Examples 7-10 was repeated to produce a 1% magnesia-coated silicon nitride. NBD-200, a conventional 1% magnesia-silicon nitride mixture, was used for comparative purposes. The coated material was sintered by the standard sintering cycle used for the conventional NBD-200 and reached full density. The material was evaluated for hardness and toughness by Vickers indentation and for phase conversion. The results and typical values for NBD-200 were:

| | Coated Invention | NBD-200 Typical |
|---|---|---|
| Dense Phase Analysis | 8.7% | 7-15% |
| Toughness (MPa m$^{\frac{1}{2}}$) | 4.7 | 4.2-4.8 |
| Hardness (Hv$_{10}$ kg) | 21.8 | 16-17 |

While the Examples above have described the processes of (i) aqueous milling of materials subject to degradation from contact with water and (ii) selective precipitation on the surface of suspended particles in connection with particles prepared by milling in the presence of surfactants, the utility of the aqueous milling and the selective precipitation processes are not restricted to such conditions.

What is claimed is:

1. A method of preparing an aqueous dispersion of ceramic particles comprising an inorganic nitride or carbide having an average diameter less than about 2 microns and having deposited thereon a substantially uniform surface layer coating of a metal compound selected from metal hydroxides and metal oxides in the substantial absence of free particles of metal hydroxide and metal oxide which comprises (i) placing nitride or carbide particles having average diameters less than about 2 microns into a solution comprising water and a surfactant which reacts with the nitride or carbide particles at a faster rate than the water, (ii) adding thereto an aqueous solution which comprises ions of the metal, which will form the metal compound, and (iii) increasing the pH of the solution of the metal ions and the nitride or carbide to deposit the metal hydroxide on the surface of the ceramic nitride or carbide particles, wherein the pH of the nitride or carbide solution is increased to no higher than about 1.5 pH units below the hydrolysis constant of the metal ion until at least about 90 weight percent of the metal ions have been deposited upon the nitride or carbide particles.

2. The method of claim 1 comprising the additional step (iv) of increasing the pH of the solution to within about 0.5 pH units below the hydrolysis constant of the metal ion.

3. The method of claim 1 wherein the pH in (iii) is maintained at least about 2 pH units below the hydrolysis constant of the metal ion.

4. A process for the preparation of suspensions of finely divided particles of a first solid which is predominantly an inorganic nitride or carbide in a fluid suspension medium which is predominantly water and with which surfaces of said first solid are chemically reactive, comprising the steps of:
  (a) mixing together particles of said first solid having a first average size, said suspension medium, and a surfactant that is (i) soluble in said suspension medium and (ii) capable of adsorbing on freshly created surfaces of said first solid at a faster rate than the suspension medium can react therewith so that the surfactant at least retards the reaction that would otherwise occur between said first solid and said fluid suspension; and
  (b) comminuting the solid particles in the mixture formed in step (a) to particles of a second average size which is smaller than said first average size;
wherein no subsequent treatment is performed to remove free metal and reduce oxygen containing impurities.

5. The process of claim 4 wherein the inorganic nitride or carbide is comprised of a nitride selected from the group consisting of silicon nitride, boron nitride, titanium nitride, and aluminum nitride.

6. The process of claim 4 wherein the inorganic nitride or carbide consists essentially of silicon nitride.

7. The process of claim 4 wherein the inorganic nitride or carbide is a carbide selected from the group consisting of silicon carbide, boron carbide, and titanium carbide.

8. The process of claim 4 wherein the inorganic nitride or carbide consists essentially of silicon carbide.

9. The process of claim 4 wherein the surfactant is selected from the group consisting essentially of aminofunctional zircoaluminate surfactants having an inorganic polymer backbone, silanes, titanium alkoxides, aluminum alkoxides, zirconium alkoxides, and iridium-based surfactants.

10. The process of claim 9, wherein said surfactant consists essentially of the reaction product of a chelated aluminum moiety, an organofunctional ligand, and a zirconium oxyhalide, the organofunctional ligand being complexed with and chemically bound to the chelated aluminum moiety, the aluminum moiety having the formula $Al_2(OR_1O)_a A_b B_c$, wherein each of A and B is hydroxy or halide and each of a, b, and c are integers such that $2a+b+c=6$, and $OR_1O$ is (a) an alpha, beta or an alpha, gamma glycol group in which $R_1$ is an alkyl group having about 1 to about 6 carbon atoms or (b) an alpha hydroxy carboxylic acid residue of the formula $$-O-CH-C-O- \atop \underset{R_3}{|} \underset{O}{\overset{\|}{}}$$

wherein $R_3$ is H or an alkyl group having about 1 to about 4 carbon atoms; said organofunctional ligand being (a) an alkyl, alkenyl, alkynl, or aralkyl carboxylic acid having about 2 to about 36 carbon atoms, (b) an aminofunctional carboxylic acid having about 2 to about 18 carbon atoms, (c) a dibasic carboxylic acid having about 2 to about 18 carbon atoms, (d) an acid anydride of dibasic acid having about 2 to about 18 carbon atoms, (e) a mercapto functional carboxylic acid having about 2 to about 18 carbon atoms, or (f) an epoxy functional carboxylic acid having about 2 to about 18 carbon atoms; said zirconium oxyhalide moiety having the formula $ZrA_d B_e$, wherein A and B are as above defined and d and e are integers such that $d+e=4$; the molar ratio of chelated aluminum moiety to zirconium oxyhalide moiety being about 1.5 to about 10; and the molar ratio of organofunctional ligand to total metal being about 0.05 to about 2.

11. The process of claim 4 comprising said second average particle size being less than about 2 microns and an additional step of filtering a dispersion of said first solid in said dispersion medium through a filter having an average opening size of about 2 microns or less and recovering in the filtrate at least 90% of the first solid content.

12. A process for depositing a first solid material upon the surface of a particle of a second solid material suspended in a dispersion medium while substantially avoiding the generation of free particles of said first solid material, comprising the steps of:
  (i) providing in solution in said dispersion medium at least two distinct reagent materials that are capable of reaction to form said first solid material; and
  (ii) establishing an increased chemical activity of at least one of said reagents in the part of said dispersion medium in the vicinity of the surface of said second solid material, compared with the bulk of sad dispersion medium,
whereby reaction occurs between said reagents and said first solid is precipitated upon the surface of said second solid while substantially avoiding precipitation of said first solid from the bulk of said dispersion medium.

13. The process of claim 12 wherein said second solid is predominantly silicon nitride and said first solid is a densification aid metal oxide for silicon nitride or a precursor of such a densification aid.

14. The process of claim 13 wherein said densification aid precursor is predominantly a rear earth hydroxide.

15. The process of claim 14 wherein the deposition while avoiding precipitation of the rare earth hydroxide from the bulk is produced by maintaining the pH of the bulk solution at least about 1.5 pH units below the hydrolysis constant of an ion of the metal until at least 90 weight percent of the metal ion has deposited on the silicon nitride.

16. The process of claim 13 wherein said densification aid precursor consists essentially of yttrium hydroxide.

17. A process for the preparation of suspensions of finely divided particles of a first solid which is predominantly an inorganic nitride or carbide in a fluid suspension medium which is predominantly water and with which surfaces of said first solid are chemically reactive, comprising the steps of
(a) mixing together particles of said first solid, said suspension medium, and a surfactant that is (i) soluble in said suspension medium and (ii) which adsorbs onto freshly created surfaces of said first solid so that the surfactant at least retards the reaction that would otherwise occur between said first solid and said dispersion medium; and then
(b) creating fresh surfaces of said first solid;
wherein no subsequent treatment is performed on said particles to remove any chemical reaction products generated by reaction between the particles and the fluid medium.

18. The process of claim 17 wherein the inorganic nitride or carbide is comprised of a nitride selected from the group consisting of silicon nitride, boron nitride, titanium nitride, and aluminium nitride.

19. The process of claim 17 wherein the inorganic nitride or carbide consists essentially of silicon nitride.

20. The process of claim 17 wherein the inorganic nitride or carbide is comprised of a carbide selected from the group consisting of silicon carbide, boron carbide, and titanium carbide.

21. The process of claim 17 wherein the inorganic nitride or carbide consists essentially of silicon carbide.

22. The process of claim 17 wherein the surfactant is selected from the group consisting essentially of aminofunctional zircoaluminate surfactants having an inorganic polymer backbone, silanes, titanium alkoxides, aluminum alkoxides, zirconium alkoxides, and iridium-based surfactants.

23. The process of claim 22, wherein said surfactant consists essentially of the reaction product of a chelated aluminum moiety, an organofunctional ligand, and a zirconium oxyhalide, the organofunctional ligand being complexed with and chemically bound to the chelated aluminum moiety, the aluminum moiety having the formula $Al_2(OR_1O)_a A_b B_c$, wherein each of A and B is hydroxy or halide and each of a, b, and c are integers such that $2a+b+c=6$, and $OR_1O$ is (a) an alpha, beta or an alpha, gamma glycol group in which $R_1$ is an alkyl group having about 1 to about 6 carbon atoms or (b) an alpha hydroxy carboxylic acid residue of the formula

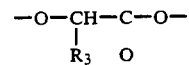

wherein $R_3$ is H or an alkyl group having about 1 to about 4 carbon atoms; said organofunctional ligand being (a) an alkyl, alkenyl, alkynyl, or aralkyl carboxylic acid having about 2 to about 36 carbon atoms, (b) an aminofunctional carboxylic acid having about 2 to about 18 carbon atoms, (c) a dibasic carboxylydride acid having about 2 to about 18 carbon atoms, (d) an acid anhydride of dibasic acid having about 2 to about 18 carbon atoms, (e) a mercapto functional carboxylic acid having about 2 to about 18 carbon atoms, or (f) an epoxy functional carboxylic acid having about 2 to about 18 carbon atoms; said zirconium oxyhalide moiety having the formula $ZrA_d B_e$, wherein A and B are as above defined and d and e are integers such that $d+e=4$; the molar ratio of chelated aluminum moiety to zirconium oxyhalide moiety being about 1.5 to about 10; and the molar ratio of organofunctional ligand to total metal being about 0.05 to about 2.

* * * * *